Inventor:
WILLIAM S. BOEHM
By Leonard L. Kalish
his attorney

Patented July 22, 1941

2,250,123

UNITED STATES PATENT OFFICE 2,250,123

LUBRICANT-CARRYING MEANS

William S. Boehm, Detroit, Mich., assignor to Lincoln Engineering Company, St. Louis, Mo., a corporation of Missouri Application July 9, 1938, Serial No. 218,275

3 Claims. (Cl. 184—105)

The present invention relates to certain new and useful lubricant-receiving fittings and it relates more particularly to fittings adapted for use on low pressure bearings and journals, as for instance on the housings of roller bearings and ball bearings, and adapted to receive lubricant (such as grease, oil and semi-fluid lubricants) from any high pressure grease-dispensing pump or so-called grease-gun, or from any standard relatively low pressure grease-gun or source of lubricant supply or of the metering or measuring type or of the non-metering or non-measuring type.

An object of the present invention is to provide a lubricant-receiving fitting which may be affixed to and become a permanent part of the housing of a low pressure bearing, as for instance of the anti-friction class such as roller bearings and ball bearings, which will serve both as a "tell-tale" to indicate to the operator when the bearing has been filled with lubricant and also to prevent developing any substantial pressure within the bearing during the lubricant-injecting operation and also thereafter to permit the moving parts of the bearing to eliminate any excess lubricant during the operation of the bearing. Thus, as the operation of some bearing, as for instance roller bearings and ball bearings, depends upon a proper lubricant content, and as any substantial amount of fluid pressure on the lubricant content of such bearing tends to heat and otherwise adversely to affect the bearing, it is desirable neither to develop any substantial initial fluid pressure on the lubricant during the filling of the bearing, nor to permit the rotary parts of the bearing to develop any fluid-pressure upon the body of the lubricant within the bearing upon the continued running of the rotary parts of the bearing.

One of the objects of the lubricant-receiving fitting of the present invention is to provide an effective and yet simple and dependable low pressure lubricant-receiving fitting which will function both as a "tell-tale" indicator during the filling of the bearing and which will also prevent the development of any initial pressure within the bearing by the grease-gun and which will also prevent the subsequent development of any substantial pressure within the bearing.

A further object of the present invention is to provide a lubricant-receiving fitting of this type which can be produced at a very low cost, so that it may be more universally applied wherever such safeguard may be desirable.

With the above and other objects in view which will appear more fully from the following detailed description, one embodiment of the present invention consists of a lubricant-receiving fitting or lubricant-conducting fitting or the like, including a base adapted telescopically to enter a receiving aperture in the bearing housing or other lubricant carrying or conducting member and adapted to be threadedly or frictionally or otherwise anchored therein and having an external recess longitudinally of said basal portion of the fitting of sufficient depth and length to form a communicating passageway betwen the interior of the bearing housing or other lubricant carrying or conducting member and the exterior thereof when the fitting is rigidly affixed in telescopic relation to the fitting-receiving aperture of said bearing housing or other member, and serving as a "tell-tale" and venting by-pass around the fitting externally thereof and without interfering with or intercepting the normal flow of lubricant through the fitting into said bearing housing or other member.

The present invention consists of other novel features and details of construction and arrangements which will appear more fully from the following detailed description and accompanying drawing.

For the purpose of illustrating the invention, there is shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawing in which like reference characters indicate like parts:

Figure 5 represents an "angle" fitting with

"drive" type base, embodying the present invention.

Figure 2:
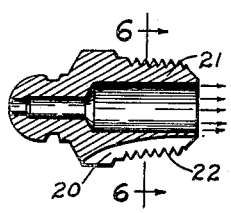
Figure 2 represents a cross-sectional view of a similar fitting but without the spring pressed ball check valve.
Figure 6:
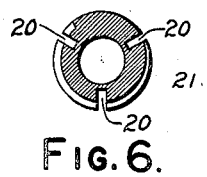

Figure 6 represents an end view of a screw base type fitting, embodying the present invention, as for instance a view on line 6—6 of Figure 2, but showing a plurality of external "tell-tale" and venting recesses.

Figure 1:
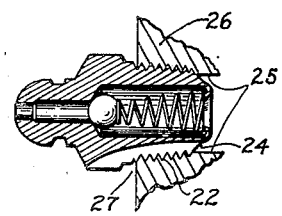
Figure 1 represents a cross-sectional view of a "straight" fitting with a screw threaded base, embodying the present invention.
Figure 3:
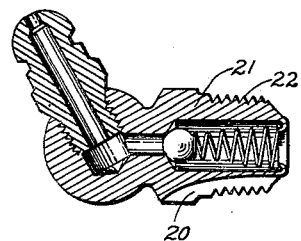
Figure 3 represents a section of an "angle" fitting with a screw threaded base, embodying the present invention.
Figure 7:
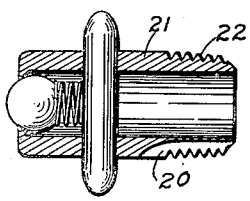

Figure 7 represents a cross-sectional view of a fitting, embodying the present invention, having a screw base similar to that shown in Figures 1, 2 and 3, but having a lubricant-receiving end of the "pin" type or "bayonet" type.

Figure 8:
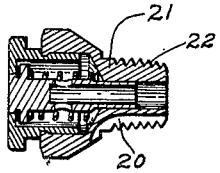

Figure 8 represents a cross-sectional view of a fitting, embodying the present invention, having a screw base similar to that shown in Figures 1, 2, 3 and 7, but having a lubricant-receiving end of the "buttonhead" type.

Figure 9:
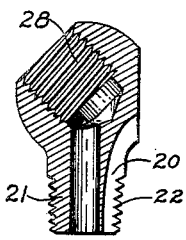

Figure 9 represents a cross-sectional view of an adapter, embodying the present invention, having a screw base similar to that shown in Figures 1, 2, 3, 7 and 8, but having a fitting receiving socket at its other end for receiving any standard or "high-pressure" fitting.

Figure 4:
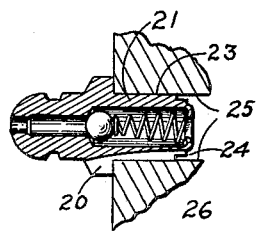
Figure 4 represents a similar cross-sectional view of a "straight" fitting with "drive" type base, embodying the present invention.
Figure 10:
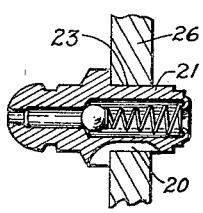

Figure 10 represents a cross-sectional view of a fitting similar to that shown in Figure 4 but showing a somewhat modified form of the present invention.

Figure 11:
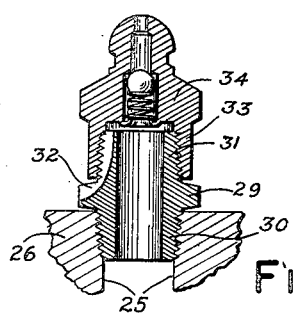

Figure 11 represents a cross-sectional view of a still further embodiment of the present invention.

Figure 12:
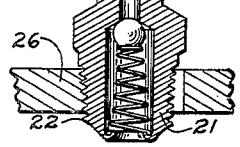

Figure 12 represents a cross-sectional view of a still further embodiment of the present invention.

In the lubrication of machinery, it is a common practice to provide each bearing with a relatively small grease-cup or lubricant-receiving member or device, sometimes referred to as a "fitting" and other times referred to as a "nipple," which is more or less permanently secured in a suitable aperture in the bearing housing or in the machine part to be lubricated;—with said aperture communicating with the interior of the bearing housing or with the bearing surfaces.

The shape of the outer or receiving ends of these lubricant-receiving "fittings" or "nipples" varies according to the construction and mechanism of the lubricant delivery coupler or nozzle or connector and according to the arbitrary shape, contour and dimensions of the operative parts of the nozzle, coupler or connector on the end of the lubricant-delivery hose or conduit of the lubricant-dispensing pump or so called "grease-gun";—the receiving ends of the "fittings" or nipples" being shaped in each instance to accommodate one or more different kinds of lubricant-delivery couplers or nozzles.

The present invention is applicable to all of the many different forms of lubricant-receiving "fittings" or "nipples". Thus, in Figures 1 to 6 inclusive of the drawing, there are illustrated embodiments of the present invention as applied to "fittings" of the general type shown in Figure 2 of the Barks Patent No. 2,010,174, while in Figure 7 the invention is shown as applied to a fitting of the "bayonet" type or "pin" type shown in the Gullborg Patent No. 1,307,733, while in Figure 8 the invention is shown as applied to a fitting of the "button-head" type.

Of whatever type or shape the fitting may be, one form of the present invention contemplates a by-pass designated generally by the numeral 20 in, or associated with, the basal portion 21 of the fitting and preferably extending across the screw threads 22 thereof or similarly across the "drive" surface 23 thereof, depending on whether the fitting is of the screw-base type or drive-base type. The latter type is applied to the bearing to be lubricated or to the fitting-receiving aperture of the machine by being axially driven or pressed or forced into a fitting-receiving aperture of the machine of such diameter that the basal portion 21 of the fitting will be received tightly, or with what is commonly referred to as a "drive"-fit. In either event, the by-pass 20 is extended from a point 24 inside the fitting-receiving aperture 25 of the bearing housing or machine part 26 (the latter only indicated schematically by a fragmentary portion of the bearing housing or machine part containing the fitting-receiving aperture) to a point 27 outside the bearing housing or machine-part 26.

The by-pass 20 may be milled into the base 21 of the fitting on a milling machine or similar machine by a saw-like milling cutter of suitable thickness and of suitable peripheral cross-section, either to make a groove or slot with a square bottom or a round bottom or a V-shaped bottom. In the particular illustrations of the present invention, the by-pass slot 20 is indicated as being of square cross-section or square bottom as shown particularly in Figure 6 where three such by-pass slots are shown. It is to be understood that the present invention is not limited to any particular number of such by-pass slots in the base of the fitting. For most purposes, one such slot is sufficient and only one such slot is intended to be indicated in Figures 1, 2, 3, 4, 5, 7, 8 and 9. Figure 6 shows the placement of a plurality of such slots as an optional form of construction. The bottom slot 20 shown in Figure 6 is representative of the position and cross-section of the by-pass slot shown particularly in Figure 2 and is equally representative of the slot shown in the other figures.

The by-pass slots may also be cut by an end-milling type of milling cutter of a diameter equal to the width of the slot, although this type of operation is less desirable as it is more expensive. In using such an end-milling type of milling cutter, the ends of the slot may be caused to terminate abruptly in end surfaces disposed at a right angle to the bottom of the slot as distinguished from having the outer end of the slot curving outwardly and having the inner end of the slot opening at the inner end of the fitting.

The amount of by-pass or "venting" may be controlled by the radial depth of the by-pass slot 20 and also by the clearance afforded at the terminals of the slot in relation to the fitting-receiving aperture.

Figure 5:
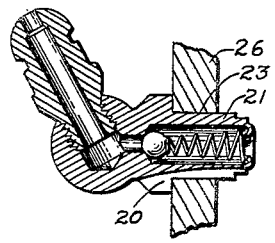

In each of the embodiments of the invention here shown, the by-pass slot 20 is shown as terminating at the inner end of the fitting. While this is the preferred form, yet the by-pass slot may be terminated short of the inner end of the fitting where the base of the fitting is of such length in relation to the fitting-engaging portion of the fitting-receiving aperture 25 so as to leave the innermost end of the fitting clear of engagement with the fitting-receiving aperture, as for instance as indicated in Figure 5 and as indicated in a somewhat different form in Figure 4. Under these circumstances, the by-pass slot 20 could be terminated, for instance, short of the end of the fitting as indicated in Figure 10.

In Figure 9, an adapter is shown embodying the present invention in which the base 21 may be either of the screw-threaded type, or of the "drive" fit type similarly provided with a by-pass 20 of the form shown in Figures 1 to 5 inclusive, or of the form shown in Figure 10;—said base being similarly adapted to be mounted in the fitting-receiving aperture or hole in the bearing housing or journal housing or machine-part. The receiving end of the adapter, instead of being adapted to receive or to be operatively engaged by the lubricant-discharging or lubricant-delivery coupler or nozzle, is provided with a fitting-receiving aperture or socket 28, into which any standard high pressure fitting may be inserted, as for instance the fitting shown in Figure 2 of the Barks Patent No. 2,010,174 or any other standard fitting either of the "push-contact" type or of the "pin" type or "bayonet" type or "button-head" type or any other type. By means of this adapter, machines already in use and having standard "fittings" thereon may be equipped with the "tell-tale" and venting by-pass without discarding the high-pressure fittings already on the machine, by merely unscrewing or taking out the fittings originally on the machine and putting into the fitting-receiving apertures an adapter of the general type shown in Figure 9 and then replacing the original "fitting" in the fitting-receiving socket 28 of the adapter.

It will be understood that the present invention is applicable irrespective of whether the "fitting" or whether the adapter is of the straight type indicated in Figures 1, 2, 4, 7 and 8, or whether it is of the angle type indicated in Figures 3, 5 and 9.

In Figure 11 is shown a still further embodiment of the present invention, wherein an adapter 29 is provided with any conventional base 30, while its outer end 31 is externally screw-threaded or provided with an external fitting-receiving surface in which the by-pass 32 is provided, and over which the base 33 of the fitting 34 is adapted to telescope either in screw-threaded engagement as indicated or in "drive-fit" engagement.

In Figure 12, a further embodiment of the present invention is illustrated in which the by-pass slot is extended against the fitting-engaging surface of the fitting-receiving aperture in the bearing housing or journalled housing or machine-part. Such by-pass aperture may be broached with the conventional broaching tool or otherwise formed.

To lubricate anti-friction bearings it is necessary to force grease or other lubricant to all parts of the bearings with the least required pressure, as excessive and confined high pressure is the cause of many bearing failures. An anti-friction bearing (roller or ball type), completely filled with grease, tends to build up internal pressures by the friction of the rollers or balls endeavoring to clear the path of rotation of excess grease, resulting in over-heating, breakage of seals, blowing out the so-called Welsh plugs and the final destruction and necessary replacement of the bearing. This condition is relieved by the fluted fitting venting off the excess grease through the by-pass, until the correct balance of grease remains for perfect operation.

It will be understood that in the practice of the present invention the by-pass is to be so restricted as to afford enough resistance to the "venting" of the lubricant as to cause the lubricant to fill all parts of the bearing or to extend to all parts of the bearing. Only a sufficient by-pass is necessary to permit the relief of any substantial pressures as may be developed in the bearing.

In using a single by-pass in the manner indicated in Figures 1 to 5 inclusive and 7 to 12 inclusive, the level of the lubricant may also be regulated when using fluid or semi-fluid lubricants when the fitting-receiving aperture is in a generally horizontal position by simply turning the fitting so as to cause the by-pass 20 to be placed at a higher or lower level across the diameter of the fitting-receiving aperture; influencing the ultimate level of the lubricant in the bearing to the extent of the diameter of the fitting-receiving aperture.

In referring, in the claims, to the base or aperture-engaging portion of the fitting or device of the present invention as being generally cylindrical, it is intended to comprehend such surfaces whether they be threaded as in Figures 1, 2, 3, 7, 8, 9, 10, 11 and 12, or whether they be of the "drive"-fit type surfaces indicated in Figures 4 and 5, and also whether the base be slightly tapered as indicated in Figures 1, 2 and 3 which is sometimes a feature of pipe threads. Likewise, in referring, in the claims, to the parallel relationship between the by-pass slot 20 and the axis of the cylindrical surface, such parallel relationship is intended to comprehend the general parallelism without reference to the slight angularity in the bottom of the by-pass slot or slight curvature in some part of the by-pass slot.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A lubricant-receiving nipple comprising a generally tubular body having a screw-threaded base for permanent securement in a screw-threaded opening of a machine to be lubricated, and having a headed coupler-receiving outer end portion, a central lubricant-inlet opening extending through said coupler-receiving outer end portion and through said screw-threaded base; the outer end of said lubricant-inlet opening being of smaller cross-sectional area than the inner portion of said lubricant-inlet opening, and an open by-pass groove along the exterior of said base and intersecting the screw-threads thereof; the cross-sectional area of said groove beneath the bottom of said screw-threads being substantially less than the cross-sectional area of the inner portion of said lubricant-inlet opening.

2. A lubricant-receiving nipple comprising a generally tubular body having a base for permanent securement in a nipple-receiving opening of a machine to be lubricated, and having a headed coupler-receiving outer end portion, a central lubricant-inlet opening extending through said coupler-receiving outer end portion and through said base; the outer end of said lubricant-inlet opening being of smaller cross-sectional area than the inner portion of said lubricant-inlet opening, and an open by-pass groove along the exterior of said base and intersecting the securement surface thereof; the effective cross-sectional area of said groove beneath said securement surface of the base being substantially less than the cross-sectional area of the inner portion of said lubricant-inlet opening.

3. A lubricant-receiving nipple comprising a generally tubular body having a base for permanent securement in a nipple-receiving opening of a machine to be lubricated, and having a headed coupler-receiving outer end portion, a central lubricant-inlet opening extending through said coupler-receiving outer end portion and through said base; the outer end of said lubricant-inlet opening being of smaller cross-sectional area than the inner portion of said lubricant-inlet opening, and an open bypass groove along the exterior of said base and intersecting the securement surface thereof; the effective cross-sectional area of said groove beneath said securement surface of the base being substantially less than the cross-sectional area of the inner portion of said lubricant-inlet opening, and an inwardly opening spring-pressed check valve in said central lubricant-inlet opening at a point intermediate the smaller diametered outer end and the larger diametered inner portion of said central lubricant-inlet opening.

WILLIAM S. BOEHM.